United States Patent
Lee et al.

(10) Patent No.: US 8,201,485 B2
(45) Date of Patent: Jun. 19, 2012

(54) TUBULAR BRAID AND COMPOSITE HOLLOW FIBER MEMBRANE USING THE SAME

(75) Inventors: Moo-Seok Lee, Seoul (KR); Joon-Khee Yoon, Seoul (KR); Sung-Hak Choi, Suwon-si (KR); Yong-Cheol Shin, Seoul (KR)

(73) Assignee: KOLON Industries, Inc., Kwacheon-si (KR)

( * ) Notice: Subject to any disclaimer, the term of this patent is extended or adjusted under 35 U.S.C. 154(b) by 439 days.

(21) Appl. No.: 12/518,557

(22) PCT Filed: Feb. 5, 2008

(86) PCT No.: PCT/KR2008/000703
§ 371 (c)(1),
(2), (4) Date: Jun. 10, 2009

(87) PCT Pub. No.: WO2008/097011
PCT Pub. Date: Aug. 14, 2008

(65) Prior Publication Data
US 2010/0024631 A1 Feb. 4, 2010

Related U.S. Application Data
(60) Provisional application No. 60/888,692, filed on Feb. 7, 2007.

Foreign Application Priority Data
Dec. 21, 2007 (KR) .................. 10-2007-0134981

(51) Int. Cl.
*D04C 1/06* (2006.01)

(52) U.S. Cl. .......................... 87/1; 87/9; 87/13
(58) Field of Classification Search .................. 87/1, 9, 87/13
See application file for complete search history.

(56) References Cited

U.S. PATENT DOCUMENTS

| | | | | | |
|---|---|---|---|---|---|
| 4,466,331 | A | * | 8/1984 | Matheson | 87/12 |
| 4,619,108 | A | * | 10/1986 | Hotta | 57/236 |
| 4,947,727 | A | * | 8/1990 | Momoi | 87/12 |

(Continued)

FOREIGN PATENT DOCUMENTS
HU P0201735 9/2002
(Continued)

OTHER PUBLICATIONS

Hungarian Patent Office, Hungarian Search Report issued in corresponding Hungarian Patent Application No. P0900593, dated Jan. 31, 2011.

*Primary Examiner* — Shaun R Hurley
(74) *Attorney, Agent, or Firm* — Sughrue Mion, PLLC

(57) ABSTRACT

A tubular braid and a composite hollow fiber membrane using the same are disclosed. The tubular braid is made by braiding yarns, the yarn made by combining thin filament and thick filament, wherein the thin filament is comprised of a plurality of monofilament having a fineness of 0.01 to 0.4 denier, and the thick filament is comprised of at least one monofilament having a fineness of 3 to 50 denier. Also, the composite hollow fiber membrane using the tubular braid of the present invention can realize excellent water permeability, high mechanical strength, good filtration reliability, great peeling strength, low dope permeation, and high stiffness.

25 Claims, 3 Drawing Sheets

U.S. PATENT DOCUMENTS

| | | | | |
|---|---|---|---|---|
| 5,186,992 | A | * | 2/1993 | Kite, III ................ 428/36.3 |
| 5,188,892 | A | * | 2/1993 | Grindstaff ................ 428/359 |
| 5,472,607 | A | | 12/1995 | Mailvaganam et al. |
| 6,153,545 | A | * | 11/2000 | LaLonde et al. ............ 442/189 |
| 6,354,444 | B1 | | 3/2002 | Mahendran et al. |
| 6,732,468 | B2 | * | 5/2004 | Safwat et al. ............ 43/9.1 |
| 7,520,121 | B2 | * | 4/2009 | Teshima et al. ............ 57/236 |
| 2008/0095875 | A1 | * | 4/2008 | Rebouillat et al. ......... 425/131.5 |
| 2009/0318048 | A1 | * | 12/2009 | Rebouillat et al. ............ 442/192 |

FOREIGN PATENT DOCUMENTS

| | | |
|---|---|---|
| JP | 2000-096368 A | 4/2000 |
| JP | 2005-023441 A | 1/2005 |

* cited by examiner

TUBULAR BRAID AND COMPOSITE HOLLOW FIBER MEMBRANE USING THE SAME

TECHNICAL FIELD

The present invention relates to a hollow fiber membrane used for a water treatment, and more particularly to a composite hollow fiber membrane.

BACKGROUND ART

A water treatment for cleaning fluid by removing pollutants therefrom may use a heating method, a phase-changing method, or a separation membrane employing method.

The separation membrane employing method can realize high reliability since it is suitable for stably providing a desired water quality based on a size of pore formed in the separation membrane. Furthermore, it is unnecessary for the separation membrane employing method to perform a heating process. In this respect, the separation membrane employing method is advantageous in that it can be widely utilized in various separation processes using microbe that may be affected by the heating process.

The separation membrane may include a flat-type membrane having a flat cross section, and a hollow fiber membrane having a hollow therein. In case of the hollow fiber membrane, there are micro-pores provided on a surface of tubular fiber structure including inner and outer diameters therein, so that pollutants are filtered through the micro-pores included in the hollow fiber membrane. In comparison to the flat-type membrane, the hollow fiber membrane has the larger surface area owing to its inner and outer diameters. Accordingly, owing to the advantageous characteristics such as the large surface area of hollow fiber membrane, the hollow fiber membrane is widely utilized for the separation membrane in the recent applications of water treatment.

In the area of water treatment, the membrane is required to have, in addition to the high water permeability, an excellent mechanical strength, which is essential to build a reliable separation membrane system.

A hollow fiber-shaped membrane may be suitable for use in water treatment as it has a high permeability per installation area. However, due to its porous structure the mechanical strength needs to be improved. Thus, there have been attempts to reinforce the hollow fiber membrane by using a fabric or tubular braid as a support of the membrane.

Some examples of such reinforced hollow fiber membranes are disclosed in, for example U.S. Pat. No. 4,061,821, and U.S. Pat. No. 5,472,607, which propose a composite separation membrane reinforced with a fabric or tubular braid having the excellent mechanical strength.

U.S. Pat. No. 4,061,821 to Hayano et al. discloses the general idea of a composite hollow fiber membrane using a tubular braid. In U.S. Pat. No. 4,061,821, however, the tubular braids are not used as a support, instead they are completely embedded in the membrane in order to compensate for reduction of water permeability due to shrinkage occurred when the hollow fiber membrane, which is formed of an acryl polymer, alone is used at a temperature higher than 80° C. Such a composite membrane has disadvantages of significantly reduced water permeability due to the increased thickness of the membrane (the thickness of the membrane is larger than the membrane with a coating of a tubular braid) and due to the increased resistance of fluid flow through the membrane.

U.S. Pat. No. 5,472,607 reports reinforcing the composite hollow membrane by coating a reinforcing material on the surface of the membrane. In this case, the reinforcing material is not embedded in the composite membrane, but it is coated with the thin film, whereby filtration reliability is deteriorated due to a defect region in the thin film.

FIG. 1 is an expanded cross-sectional view of illustrating the composite hollow fiber membrane disclosed in U.S. Pat. No. 4,061,821, and FIG. 2 is an expanded cross-sectional view of illustrating the composite hollow fiber membrane disclosed in U.S. Pat. No. 5,472,607.

As shown in FIGS. 1 and 2, these membranes have a finger-like structure, and have voids D in the outer portion of the membrane or in the thin film layer, wherein the defect region (D) is comprised of a micro-pore having a diameter of 5 µm or above.

Voids may function as a defect when the polymer film exhibits the mechanical strength to support the membrane. Particularly, when the skin layer, which is the densest outermost layer of the multi-layer thin film coating, is damaged, the filtration reliability of the membrane may be reduced.

The composite hollow fiber membrane used as the separation membrane additionally requires a high peeling strength in addition to the excellent permeability, great mechanical strength, and high filtration reliability. That is, the composite hollow fiber membrane is required to have a good mechanical strength to be suitable for a submerged separation module in the fields of water treatment, in order to endure the friction and physical impact generated between membranes due to aeration in the water treatment system. In this respect, it is necessary for the composite hollow fiber membrane to obtain the high peeling strength and filtration reliability.

U.S. Pat. No. 6,354,444 proposes a composite hollow fiber membrane coated with a polymer resinous thin film on a braid made of monofilaments having a fineness of 0.5-7 denier.

In order to apply the hollow fiber membrane in various fields of water treatment, there are requirements for the high water permeability, the excellent mechanical strength, the high filtration reliability, the high peeling strength, the low dope permeation, and the high stiffness. The existing composite hollow fiber membrane can satisfy some of the aforementioned requirements. Thus, there is an increasing demand for the development of composite hollow fiber membrane which can satisfy all the aforementioned requirements.

DISCLOSURE

Technical Problem

It is an object of the present invention to provide a tubular braid that realizes high permeability, excellent mechanical strength, excellent filtration reliability, high peeling strength, and easy control for permeation of a dope and high stiffness by coating a polymer resinous thin film on a supporting material of braid, and a composite hollow fiber membrane using the same.

Technical Solution

The tubular braid for a composite hollow fiber membrane for water treatment, the tubular braid made by braiding yarns, is characterized in that: the yarn comprises first and second filaments, the first filament consists of a plurality of monofilaments having a fineness of 0.01 denier to 0.4 denier, and the second filament consists of at least one monofilament having a fineness of 3 denier to 50 denier.

Also, the composite hollow fiber membrane is comprised of a tubular braid made of braiding yarns, the yarn comprising first and second filaments, and a polymer resinous thin film coated on a surface of the tubular braid, wherein the first filament consists of a plurality of monofilaments having a fineness of 0.01 denier to 0.4 denier, and the second filament consists of at least one monofilament having a fineness of 3 denier to 50 denier.

Advantageous Effects

The composite hollow fiber membrane of the present invention provides the following advantages.

First, the first filament consisting of a plurality of relatively thin monofilaments is included in the tubular braid, whereby a high peeling strength is obtained between the tubular braid and the polymer resinous thin film. Thus, a pore formed in the surface of tubular braid decreases in size, so that it is possible to prevent a dope from being completely embedded in the tubular braid, and to prevent a hollow from being clogged with the dope.

Also, the second filament consisting of at least one relatively thick monofilament is included in the tubular braid, resulting in high stiffness and mechanical strength of composite hollow fiber membrane.

Also, the tubular braid is coated with the polymer resinous thin film, so that it is possible to compensate for a tensile strength and pressure resistance of composite hollow fiber membrane. Also, the polymer resinous thin film comprises a skin layer of dense structure and an inner layer of sponge structure, resulting in high filtration reliability and water permeability.

BEST MODE

The present invention is now understood more concretely by comparison between examples of the present invention and comparative examples. However, the present invention is not limited to such examples.

The term 'filament' as used herein means 'a monofilament' or 'a multifilament having a plurality of monofilaments.'

The term 'thin filament' as used herein means a filament consisting of a plurality of relatively thin monofilaments.

The term 'thick filament' as used herein means a filament consisting of at least one relatively thick monofilament.

Figure 1:
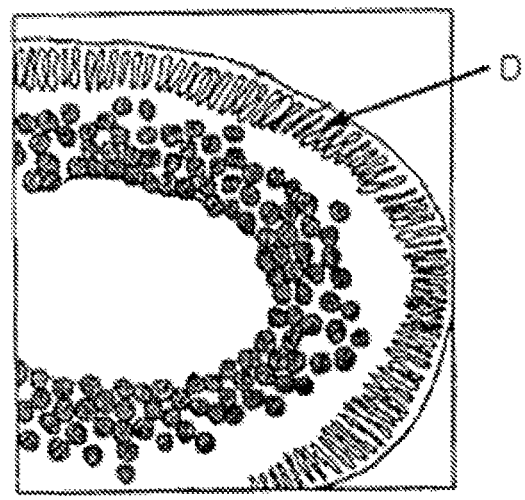
FIGS. 1 and 2 are expanded cross section views of illustrating a composite hollow fiber membrane according to the related art.
Figure 2:
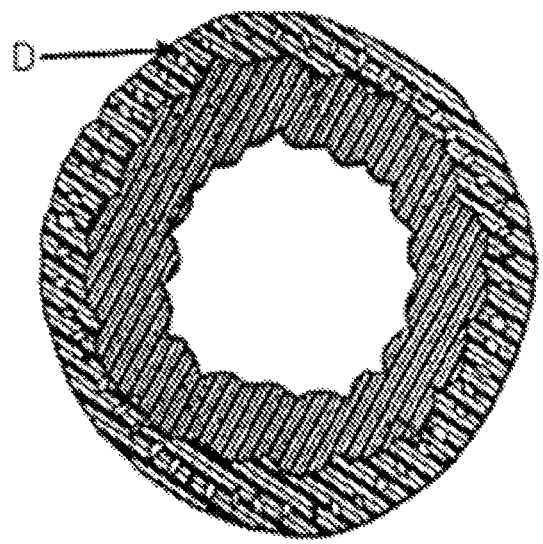
Figure 3:
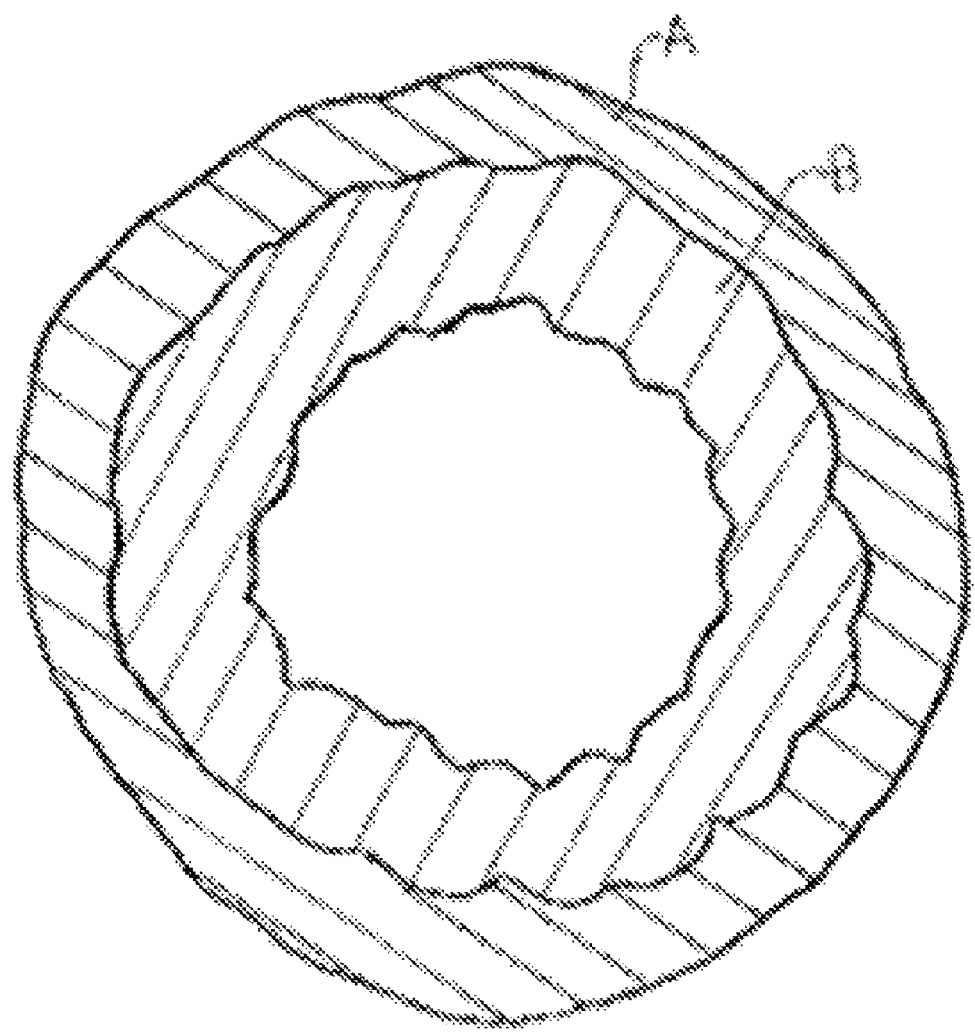
FIG. 3 is an expanded cross section view of illustrating a composite hollow fiber membrane according to one embodiment of the present invention.

FIG. 3 is an expanded cross section view of illustrating a composite hollow fiber membrane according to one embodiment of the present invention.

As shown in FIG. 3, the composite hollow fiber membrane according to the present invention is comprised of a tubular braid 10 that functions as a reinforcing material; and a polymer resinous thin film 20 that is coated on the surface of tubular braid 10.

Figure 4:
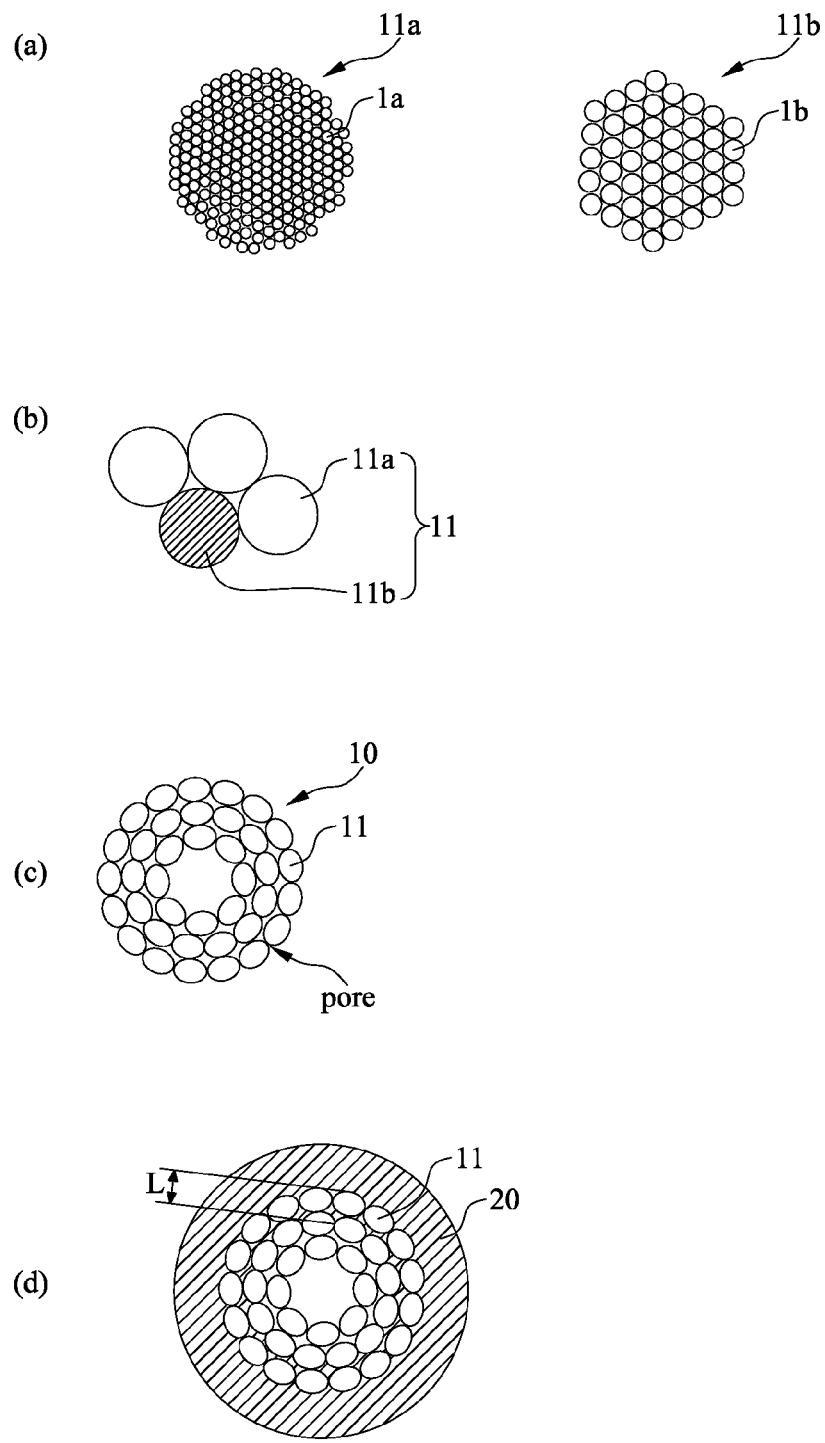
FIG. 4 (a) to (d) respectively illustrate filaments, a yarn, a tubular briad, and a composite hollow fiber membrane of the present invention.

FIG. 4 (a) to (d) respectively illustrate filaments, a yarn, a tubular briad, and a composite hollow fiber membrane of the present invention.

The tubular braid 10 is formed by braiding yarns 11, wherein the yarn 11 is made by combining thin filaments 11a and thick filaments that are capable of improving the properties of composite hollow fiber membrane.

First, the thin filament 11a included in the tubular braid 10 leads to a high peeling strength between the tubular braid 10 and the polymer resinous thin film 20. Also, a pore existing in the surface of tubular braid 10 is decreased in size owing to the thin filament 11a included in the tubular braid 10, so that it is possible to prevent a dope used for forming the polymer resinous thin film from being completely embedded in the tubular braid 10 and to prevent a hollow from being clogged with the dope.

That is, according as the thin filament 11a is included in the tubular braid 10, a contact area between the tubular braid 10 and the polymer resinous thin film 20 is increased so that the peeling strength becomes high in the polymer resinous thin film 20 coated on the tubular braid 10. Furthermore, since the pore existing in the surface of tubular braid 10 is decreased in size, it is possible to prevent the dope used for forming the polymer resinous thin film 20 coated on the surface of tubular braid 10 from being completely embedded in the tubular braid 10 and to prevent the hollow from being clogged with the dope.

For improvement of the aforementioned properties, it is preferable that the thin filament 11a be made of a plurality of monofilaments 1a, each monofilament 1a having a fineness of 0.01 denier to 0.4 denier.

If the fineness of monofilament 1a used for the thin filament 11a is above 0.4 denier, the peeing strength may be reduced between the tubular braid 10 and the polymer resinous thin film 20 coated on the surface of tubular braid 10, and the dope may permeate. If the fineness of monofilament 1a used for the thin filament 11a is less than 0.01 denier, it results in the easy control for the dope permeation and the high peeling strength between the tubular braid 10 and the polymer resinous thin film 20, whereas it may cause the low water permeability, the complicated producing process, and the high producing cost.

In consideration to the peeling strength, the easy control for the dope permeation and the economical efficiency, the thin filament 11a is comprised of 150 to 7,000 monofilaments 1a; and the total fineness of thin filament 11a is in a range between 30 denier and 140 denier.

Next, the thick filament 11b included in the tubular braid 10 leads to the high mechanical strength by improving the stiffness of composite hollow fiber membrane.

That is, a good elasticity of thick filament 11b enables the improvement of stiffness. Accordingly, when the composite hollow fiber membrane is applied to a submerged module, it is possible to prevent the hollow fiber membrane from being bent, thrown or tangled.

Preferably, the thick filament 11b is made by combining monofilaments 1b, each monofilament 1b having a fineness of 3 denier to 50 denier.

If the fineness of monofilament 1b included in the thick filament 11b is less than 3 denier, the bending strength and stiffness may be deteriorated due to the low elasticity of filament. Meanwhile, if the fineness of monofilament 1b included in the thick filament 11b is above 50 denier, the braiding property may be deteriorated.

In consideration to the stiffness and braiding property, the thick filament 11b is comprised of 1 to 170 monofilaments 1b, and the total fineness of thick filament 11b is in a range between 3 denier and 500 denier.

The yarn 11 is made by combining the thick filament 11b and the thin filament 11a. Preferably, the yarn 11 is made by combining 3 or 4 thin filaments 11a, and 1 or 2 thick filaments 11b. In consideration to the braiding property of tubular braid 10, the tubular braid 10 is comprised of 15 to 40 yarns 11, preferably.

The total fineness of yarn 11 comprised of the thick filament 11b and the thin filament 11a is within a range of 200 denier to 600 denier, and more preferably a range of 350 denier to 500 denier. If the total fineness of yarn 11 is less than 200 denier, the yield is lowered. Meanwhile, if the total fineness of yarn 11 is above 600 denier, it may cause a problem of large outer diameter in the tubular braid 10.

Preferably, a ratio of total fineness of the thin filament 11a to that of the thick filament 11b included in the yarn 11 is 0.1:1~3:1. More preferably, the ratio is 0.5:1~2:1. If the ratio is less than 0.1, it is difficult to improve the peeling strength. If the ratio is above 3.0, it is difficult to improve the stiffness.

In the tubular braid 10 according to one embodiment of the present invention, the thin filament 11a may be made of the monofilament 1a of polyethylene terephthalate (PET), and the thick filament 11b may be made of the monofilament 1b of polyethylene terephthalate (PET).

In the tubular braid 10 according to another embodiment of the present invention, the thin filament 11a may be made of the monofilament 1a of polyethylene terephthalate (PET), and the thick filament 11b may be made of the monofilament 1b of nylon.

If both the thin filament 11a and the thick filament 11b are formed of PET according to one embodiment of the present invention, or the thin filament 11a and the thick filament 11b are respectively formed of PET and nylon according to another embodiment of the present invention, the stiffness and water permeability of composite hollow fiber membrane improve as shown in the following embodiment of the present invention.

The composite hollow fiber membrane is comprised of the polymer resinous thin film 20 coated on the surface of tubular braid 10, wherein the polymer resinous thin film 20 has effects on the water permeability and filtration reliability of composite hollow fiber membrane as well as the mechanical strength of composite hollow fiber membrane.

In view of the mechanical strength, the mechanical strength of polymer resinous thin film 20 is lower than that of tubular braid 10. However, the polymer resinous thin film 20 has such a mechanical strength as not to be damaged or peeled off, so that it is possible to compensate for the tensile strength and pressure resistance of composite hollow fiber membrane.

In view of the water permeability and filtration reliability, the tubular braid 10 has the larger pore than that of the polymer resinous thin film 20. Thus, the filtrate which can pass the polymer resinous thin film 20 can also pass through the tubular braid 10. In other words, the water permeability of filtrate is determined not based on the tubular braid 10 having the relatively large-sized pore but based on the polymer resinous thin film 20 having the relatively small-sized pore (not shown). Accordingly, the water permeability of overall composite hollow fiber membrane is determined based on the microporous structure and porosity of the polymer resinous thin film 20.

The microporous structure and porosity of polymer resinous thin film 20 is determined based on a thermodynamic stability that differs according to the composition of dope. That is, when a thermodynamically stable dope is used, the resulting film has a finger-like structure. On the contrary, a dope with a low thermodynamic stability forms a sponge structure with no void or defect region. For instance, a dope is sued with a solvent having a strong solvent power such as N-methyl-2-pyrrolidone (NMP), the resulting thin film will have a finger-like structure because the dope has a high thermodynamic stability.

The polymer resinous thin film 20 includes a skin layer having a dense structure, and an inner layer having a sponge structure, thereby improving the filtration reliability and water permeability. The term "inner layer" as used here indicates that the layer is formed inwardly in the tubular membrane structure. The skin layer is provided with micro-pores (not shown) having a diameter in a range from 0.01 μm to 1 μm. The inner layer is provided with micro-pores (not shown) having a diameter less than 10 μm, more preferably, 5 μm. In case of that any defect region larger than 10 μm exists in the inner layer of polymer resinous thin film 20, that is, the micro-pore having the diameter of 10 μm or larger exists in the inner layer of polymer resinous thin film 20, the filtration reliability is lowered greatly.

In an embodiment of the present invention, the diameters of micro-pores formed in the inner layer of sponge structure are continuously and gradually increased toward the central hollow core of the tubular membrane, whereby the water permeability improves.

After the polymer resinous thin film 20 is coated on the tubular braid 10, a coagulating process is performed thereto. For this coagulating process, the pores are formed due to the discharge of organic solvent. At this time, since the skin layer of polymer resinous thin film 20 is more rapidly coagulated than the inner layer of polymer resinous thin film 20, the pores formed in the skin layer of polymer resinous thin film 20 are relatively smaller than the pores formed in the inner layer of polymer resinous thin film 20. Also, if minimizing a time period for coagulating the polymer resinous thin film 20, the polymer resinous thin film 20 is sequentially coagulated from the skin layer to the inner layer, whereby the diameters of micro-pores are gradually increased from the skin layer to the inner layer.

In view of the mechanical strength and water permeability, the thickness of polymer resinous thin film 20 is within a range of 10~200 μm, preferably. If the thickness of polymer resinous thin film 20 is less than 10 μm, the mechanical strength is reduced. On the contrary, if the thickness of polymer resinous thin film 20 is above 200 μm, the water permeability is reduced.

Also, it is preferable that a penetrating length (L) of the polymer resinous thin film 20 into the tubular braid 10 is within a range of 10%~30% of the thickness of tubular braid 10 (that is, the difference between the outer diameter of tubular braid 10 and the inner diameter of tubular braid 10). If the penetrating length (L) of the polymer resinous thin film 20 into the tubular braid 10 is less than 10% of the thickness of tubular braid 10, it has the disadvantage of low mechanical strength. Meanwhile, if the penetrating length (L) of the polymer resinous thin film 20 into the tubular braid 10 is above 30% of the thickness of tubular braid 10, the water permeability is reduced.

The polymer resinous thin film 20 of the present invention is formed by coating a spinning dope consisting of polymer resin, organic solvent, and additive of polyvinylpyrrolidone and hydrophilic compound on the surface of tubular braid 10.

A process of fabricating the composite hollow fiber membrane with the polymer resinous thin film 20 formed by coating the spinning dope on the surface of tubular braid 10 comprises steps of coating the spinning dope on the surface of tubular braid 10 by passing the tubular braid 10 through a central portion of a double tubular nozzle and simultaneously feeding the spinning dope to the surface of tubular braid 10; extruding them in the air outside the double tubular nozzle;

coagulating them in an external coagulating liquid to form the composite hollow fiber membrane structure; and washing and drying the composite hollow fiber membrane structure.

At this time, the spinning dope for forming the polymer resinous thin film can be obtained by dissolving a polymer resin, an additive (polyvinylpyrrolidone), and a hydrophilic compound in an organic solvent. In an embodiment of the present invention, the spinning dope may be made of 10% to 50% by weight of a polymer resin, 1% to 30% by weight of an additive (polyvinylpyrrolidone) plus a hydrophilic compound, and 20% to 89% by weight of an organic solvent.

The polymer resin may be a polysulfone resin, polyethersulfone resin, sulfonated polysulfone resin, polyvinylidenefluoride (PVDF) resin, polyacrylonitrile (PAN) resin, polyimide resin, polyamideimide resin, polyetherimide resin and so on. The organic solvent may be dimethyl acetamide, dimethyl formamide or a mixture thereof.

The hydrophilic compound is water or glycol compound. In one embodiment of the present invention, the hydrophilic compound is polyethylene glycol having a molecular weight less than 2,000. Since the water or glycol compound, which is hydrophilic, reduces the stability of the spinning dope, it is more likely to form the polymer resinous thin film of a sponge structure. This is because a polymer resin tends to form a finger-like structure thin film wherein defects or voids (micro-pores having a diameter larger than 10 μm are formed in the membrane when the stability of the spinning dope is high, while the stability of the spinning dope is low, a sponge structure thin film tends to be formed). In one embodiment of the present invention, the stability of the spinning dope is reduced by adding a hydrophilic compound such as water or a glycol compound, which results in the formation of sponge structure film and the additive increases the water permeability of the membrane by making it hydrophilic.

Hereinafter, the advantageous properties of the composite hollow fiber membrane according to the present invention will be explained with the following examples and comparative examples.

Example 1

First, one yarn is prepared, which is made by combining three thin filaments of 65 denier comprised of 216 strands of PET monofilaments having fineness of 0.3 denier, and one thick filament of 360 denier comprised of 48 strands of PET monofilaments having fineness of 7.5 denier. At this time, a total fineness of one yarn is 555 denier. Also, a ratio of the total fineness of thin filament to the total fineness of thick filament is 0.54.

After, a tubular braid is prepared, which is made to have an outer diameter of 2.6 mm by braiding the 20 yarns.

Then, a transparent spinning dope is prepared, which is made by mixing and dissolving a polymer resin comprised of 17% by weight of polysulfone, and an additive comprised of 9% by weight of polyvinylpyrrolidone and 10% by weight of polyethyleneglycol in an organic solvent comprised of 64% by weight of dimethylformamide.

The transparent spinning dope is fed into a double tubular nozzle having a diameter of 2.5 mm, and simultaneously the tubular braid is passed through the central portion of the double tubular nozzle, so that the spinning dope is coated on the surface of tubular braid, and is extruded to the air. At this time, the ratio (k) of the advancing speed of the braid to the feeding rate of the spinning dope is 750 g/m$^2$, and the coating thickness of the spinning dope is 0.2 mm. After passing through the tubular braid coated with the spinning dope into an air gap of 10 cm, it is coagulated in an external coagulating bath with a temperature of 35° C. Subsequently, the composite hollow fiber membrane is prepared by washing in a washing tank and winding the washed one.

Example 2

First, a yarn is prepared, which is made by combining three thin filaments of 65 denier comprised of 650 strands of PET monofilaments having a fineness of 0.1 denier, and one thick filament of 240 denier comprised of 48 strands of PET monofilaments having a fineness of 5 denier. At this time, a total fineness of one yarn is 435 denier. Also, a ratio of the total fineness of thin filament to the total fineness of thick filament is 0.81.

A composite hollow fiber membrane is produced in the same process and condition as Example 1, except that a tubular braid is used, which is braided to have an outer diameter of 2 mm by using 20 yarns.

Example 3

First, a yarn is prepared, which is made by combining four thin filaments of 65 denier comprised of 650 strands of PET monofilaments having a fineness of 0.1 denier, and two thick filaments of 100 denier comprised of 2 strands of nylon monofilaments having a fineness of 50 denier. At this time, a total fineness of one yarn is 460 denier. Also, a ratio of the total fineness of thin filament to the total fineness of thick filament is 1.3.

A composite hollow fiber membrane is produced in the same process and condition as Example 1, except that a tubular braid is used, which is braided to have an outer diameter of 2.7 mm by using 20 yarns.

Example 4

A composite hollow fiber membrane is produced in the same process and condition as Example 1, except that polyvinylidene fluoride resin is used as the polymer resin in the production of a spinning dope.

Example 5

A composite hollow fiber membrane is produced in the same process and condition as Example 2, except that polyvinylidene fluoride resin is used as the polymer resin in the production of a spinning dope.

Example 6

A composite hollow fiber membrane is produced in the same process and condition as Example 1, except that a yarn is prepared by combining four thin filaments of 30 denier comprised of 3000 strands of PET monofilaments having a fineness of 0.01 denier, and one thick filament of 80 denier comprised of 16 strands of PET monofilaments having a fineness of 5 denier.

Example 7

A composite hollow fiber membrane is produced in the same process and condition as Example 1, except that a yarn is prepared by combining three thin filaments of 140 denier comprised of 350 strands of PET monofilaments having a fineness of 0.4 denier, and one thick filament of 180 denier comprised of 18 strands of PET monofilaments having a fineness of 10 denier.

Example 8

A composite hollow fiber membrane is produced in the same process and condition as Example 1, except that a yarn is prepared by combining four thin filaments of 48.5 denier comprised of 485 strands of PET monofilaments having a fineness of 0.1 denier, and two thick filaments of 3 denier comprised of 1 strand of PET monofilament having a fineness of 3 denier.

Example 9

A composite hollow fiber membrane is produced in the same process and condition as Example 1, except that a yarn is prepared by combining three thin filaments of 33.3 denier comprised of 333 strands of PET monofilaments having a fineness of 0.1 denier, and one thick filament of 500 denier comprised of 10 strands of PET monofilaments having a fineness of 50 denier.

Example 10

A composite hollow fiber membrane is produced in the same process and condition as Example 1, except that a yarn is prepared by combining three thin filaments of 30 denier comprised of 300 strands of PET monofilaments having a fineness of 0.1 denier, and two thick filaments of 450 denier comprised of 45 strands of PET monofilaments having a fineness of 10 denier.

Example 11

A composite hollow fiber membrane is produced in the same process and condition as Example 1, except that a yarn is prepared by combining three thin filaments of 100 denier comprised of 1000 strands of PET monofilaments having a fineness of 0.1 denier, and one thick filament of 100 denier comprised of 10 strands of PET monofilaments having a fineness of 10 denier.

Comparative Example 1

A composite hollow fiber membrane is produced in the same process and condition as Example 1, except that a tubular braid is used, which is braided to have an outer diameter of 2.6 mm by using 16 yarns prepared by 3 multi-filaments having 150 deniers comprised of 600 strands of PET monofilaments having a fineness of 0.25 denier.

Comparative Example 2

A composite hollow fiber membrane is produced in the same process and condition as Example 1, except that a tubular braid is used, which is braided to have an outer diameter of 2.6 mm by using 16 yarns prepared by 3 multi-filaments having 100 deniers comprised of 100 strands of monofilaments having a fineness of 1.0 denier. The result of evaluation for the structure and physical properties of the produced composite hollow fiber membrane is shown in Table 1.

Peeling Strength

The load at the moment when a coated polymer resinous thin film is peeled from a tubular braid by using a tensile tester was measured and divided into the area m² to which shear strength is applied to calculate the peeling strength.

Detailed measurement conditions are as follows.
measuring instrument: Instron® 4303
load cell: 1 KN
crosshead speed: 25 mm/min
grasping distance: 50 mm
sample: the sample was produced by bonding and securing one strand of a composite hollow fiber membrane to a polypropylene tube having a diameter of 6 mm using a polyurethane resin so that the length of the bonding portion be 10 mm.

$$\text{Peeling Strength (Pa)} = \frac{\text{load of yield point (kg)}}{\text{application area of shear strength (m}^2\text{)}}$$

The peeling strength is defined as the shear strength per unit area applied to a coated polymer resinous thin film when the sample is extended.

The application area (m²) of the shear strength is calculated by the equation: π×outer diameter (m) of composite hollow fiber membrane×length (m) of bonding portion of composite hollow fiber membrane.

Permeation of Dope

A cross section of the produced composite hollow fiber membrane is examined with a microscope so as to observe a permeating degree of the dope into the tubular braid.

Stiffness

The maximum load at the moment when a composite hollow fiber membrane is pressed by a sample holder in Instron® 4303 and bent in a compression mode was measured to thus calculate the stiffness.

measuring instrument: Instron® 4303
load cell: 10 N
crosshead speed: 20 mm/min
grasping distance: 100 mm
sample: composite hollow fiber membrane having a length of 150 mm Water Permeability (Lp)

First, four strands of composite hollow fiber membrane and an acryl tube having a diameter of 10 mm and a length of 170 mm are prepared. After the composite hollow fiber membrane is cut to have a length of 160 mm, one end of the composite hollow fiber membrane cut is sealed by an adhesive. After the composite hollow fiber membrane is inserted into the acryl tube, a space between one end of the acryl tube and the composite hollow fiber membrane is sealed. Then, when pure water is put into the acryl tube, and a nitrogen pressure is applied to the acryl tube for one minute, an amount of pure water permeated through the composite hollow fiber membrane is measured. A unit of the water permeability (Lp) is (ml/cm²)×(min)×(kg/cm²).

TABLE 1

Result of Physical Properties of Composite Hollow Fiber Membrane

| Classification | Peeling Strength (MPa) | Stiffness (Kg) | Dope Permeation | Water permeability (Lp) |
|---|---|---|---|---|
| Example 1 | 0.84 | 0.125 | No permeation | 1.5 |
| Example 2 | 0.96 | 0.110 | No permeation | 1.3 |
| Example 3 | 0.94 | 0.160 | No permeation | 2.0 |
| Example 4 | 1.21 | 0.095 | No permeation | 1.8 |
| Example 5 | 1.28 | 0.076 | No permeation | 1.7 |
| Example 6 | 1.61 | 0.099 | No permeation | 0.8 |
| Example 7 | 0.68 | 0.120 | No permeation | 1.3 |
| Example 8 | 0.97 | 0.073 | No permeation | 1.7 |
| Example 9 | 0.93 | 0.230 | No permeation | 1.6 |
| Example 10 | 0.73 | 0.130 | No permeation | 0.8 |
| Example 11 | 1.1 | 0.091 | No permeation | 1.2 |
| Comparative example 1 | 1.53 | 0.042 | No permeation | 0.8 |
| Comparative example 2 | 0.66 | 0.147 | Permeated (hollow clogged with dope) | — |

As shown in the above results, the composite hollow fiber membrane according to one embodiment of the present invention that is made of the yarn consisting of the thin filament and the thick filament has the excellent permeability, the high peeling strength and the great stiffness.

In case of the composite hollow fiber membrane consisting of the monofilament of the same kind having the fineness larger than 0.5 denier, the braid is comprised of the thin monofilament having the fineness of 0.5 denier or above. Thus, the surface area of braid being in contact with the polymer resinous thin film is decreased so that the peeling strength of polymer resinous thin film coated on the surface of braid is reduced.

The pore existing in the surface of braid is increased in size owing to the thick monofilament, the dope of polymer resin coated permeates into the braid, so that the dope may be completely embedded in the braid or the hollow may clog with the dope, thereby increasing the permeation resistance. Accordingly, it prevents the smooth flow of water permeated so that the permeability of membrane is largely reduced. If the viscosity of dope is increased so as to prevent the permeation of dope, it is impossible to produce the optimal membrane due to the limitation on diversity of composition of coating layer.

In the meantime, the braid of composite hollow fiber membrane may be made of a thin multi-filament comprised of the same kind of monofilaments having the fineness of 0.5 denier or less to improve the peeling strength and to decrease the permeation of dope. In this case, it can not be used for the submerged module due to the low stiffness of membrane. That is, since the thin multi-filament has the low elasticity, the stiffness of tubular braid becomes reduced. Thus, if the braid using the thin filament is applied for the submerged module, the composite hollow fiber membrane is apt to be bent, thrown or tangled.

Industrial Applicability

The tubular braid of the present invention and the composite hollow fiber membrane using the same can be utilized in the water-treatment field.

The invention claimed is:

1. A tubular braid for a composite hollow fiber membrane for water treatment, the tubular braid made by braiding yarns, the yarns each comprising first and second filaments, wherein the first filament consists of a plurality of monofilaments having a fineness of 0.01 to 0.4 denier, and the second filament consists of at least one monofilament having a fineness of 3 to 50 denier.

2. The tubular braid according to claim 1, wherein a total fineness of the yarn is 200 to 600 denier.

3. The tubular braid according to claim 1, wherein a ratio of total fineness of the first filament to total fineness of the second filament included in the yarn is 0.1:1 to 3:1.

4. The tubular braid according to claim 1, wherein the first filament is made by combining 150 to 7,000 monofilaments, and a total fineness of the first filament is within a range of 30 to 140 denier.

5. The tubular braid according to claim 1, wherein the second filament is made by combining 1 to 170 monofilaments, and a total fineness of the second filament is within a range of 3 to 500 denier.

6. The tubular braid according to claim 1, wherein the yarn is made by combining 3 or 4 first filaments and 1 or 2 second filament(s).

7. The tubular braid according to claim 1, wherein the tubular braid is made by braiding 15 to 40 yarns.

8. The tubular braid according to claim 1, wherein the first filament is formed of polyethylene terephthalate, and the second filament is formed of nylon.

9. The tubular braid according to claim 1, wherein the first filament is formed of polyethylene terephthalate, and the second filament is formed of polyethylene terephthalate.

10. A composite hollow fiber membrane for water treatment comprising:
    a tubular braid made by braiding yarns, the yarn comprising first and second filaments; and
    a polymer resinous thin film coated on a surface of the tubular braid,
    wherein the first filament is comprised of a plurality of monofilament having a fineness of 0.01 to 0.4 denier, and the second filament consists of at least one monofilament having a fineness of 3 to 50 denier.

11. The composite hollow fiber membrane according to claim 10, wherein the polymer resinous thin film consists of a skin layer provided with micro-pores having a diameter of 0.01 to 1 μm, and an inner layer provided with micro-pores having a diameter less than 10 μm.

12. The composite hollow fiber membrane according to claim 11, wherein the diameters of micro-pores formed in the inner layer are continuously and gradually increased toward central hollow core of tubular membrane.

13. The composite hollow fiber membrane according to claim 10, wherein a thickness of polymer resinous thin film is within a range of 10 μm to 200 μm.

14. The composite hollow fiber membrane according to claim 10, wherein the polymer resinous thin film penetrates into the tubular braid, and its penetrating length is within a range of 10% to 30% of a difference between an outer diameter of the tubular braid and an inter diameter of the tubular braid.

15. The composite hollow fiber membrane according to claim 10, wherein the polymer resinous thin film is coated on the surface of tubular braid by using a spinning dope comprised of a polymer resin, an organic solvent, and an additive of polyvinylpyrrolidone and hydrophilic compound.

16. The composite hollow fiber membrane according to claim 15, wherein the polymer resin is included at 10 to 50% by weight, the additive of polyvinylpyrrolidone and hydrophilic compound is included at 1 to 30% by weight, and the organic solvent is included at 20 to 89% by weight.

17. The composite hollow fiber membrane according to claim 15, wherein:
    the polymer resin comprises polysulfone resin, polyethersulfone resin, sulfonated polysulfone resin, polyvinylidenefluoride resin, polyacrylonitrile resin, polyimide resin, polyamideimide resin, or polyetherimide resin;
    the organic solvent comprises dimethyl acetamide, or dimethyl formamide; and
    the hydrophilic compound comprises water or glycol compound.

18. The composite hollow fiber membrane according to claim 10, wherein a total fineness of the yarn is 200 to 600 denier.

19. The composite hollow fiber membrane according to claim 10, wherein a ratio of total fineness of the first filament to total fineness of the second filament included in the yarn is 0.1:1 to 3:1.

20. The composite hollow fiber membrane according to claim 10, wherein the first filament is made by combining 150 to 7,000 monofilaments, and a total fineness of the first filament is within 30 to 140 denier.

21. The composite hollow fiber membrane according to claim 10, wherein the second filament is made by combining 1 to 170 monofilaments, and a total fineness of the second filament is within a range of 3 to 500 denier.

22. The composite hollow fiber membrane according to claim 10, wherein the yarn is made by combining 3 or 4 first thin-filaments and 1 or 2 second filament(s).

23. The composite hollow fiber membrane according to claim 10, wherein the tubular braid is made by braiding of 15 to 40 yarns.

24. The composite hollow fiber membrane according to claim 10, wherein the first filament is formed of polyethylene terephthalate, and the second filament is formed of nylon.

25. The composite hollow fiber membrane according to claim 10, wherein the first filament is formed of polyethylene terephthalate, and the second filament is formed of polyethylene terephthalate.

* * * * *